United States Patent
Bogue et al.

[15] 3,666,962
[45] May 30, 1972

[54] ELECTRICAL POWER SUPPLY

[72] Inventors: John C. Bogue, Santa Monica; Robert I. Sarbacher, Arcadia, both of Calif.

[73] Assignee: said Bogue, by said Sarbacher

[22] Filed: Dec. 15, 1969

[21] Appl. No.: 884,783

[52] U.S. Cl...................................307/65, 320/39, 307/77
[51] Int. Cl..............................................H02j 7/00
[58] Field of Search..............307/65, 66, 77; 320/46, 39, 320/40

[56] References Cited

UNITED STATES PATENTS

| | | | |
|---|---|---|---|
| 2,992,363 | 7/1961 | Granquist | 307/66 UX |
| 3,005,943 | 10/1961 | Jaffee | 320/46 X |
| 3,395,288 | 7/1968 | Von Brimer | 320/40 X |
| 3,419,779 | 12/1968 | Zehner | 307/66 X |
| 3,441,802 | 4/1969 | Bradley | 307/65 X |

Primary Examiner—Herman J. Hohauser
Attorney—Witherspoon and Lane

[57] ABSTRACT

An electrical power supply, particularly adapted for intermittent use, has an extremely long standby life. A series of squib actuated electrochemical batteries are controlled by a selective activation circuit, so that each reserve or secondary battery of the series is activated only after the preceeding battery has substantially spent its useful life. The circuit responds to a drop in battery output voltage or to an increase in gas pressure within the battery encapsulation signalling the end of the battery's useable life, to substitute the next battery in the series, and to activate it by firing its squib.

20 Claims, 4 Drawing Figures

INVENTORS
JOHN C. BOGUE
ROBERT I. SARBACHER

ELECTRICAL POWER SUPPLY

BACKGROUND OF INVENTION

There are a number of instances where a standby source of electrical power is needed, so that power is available when required, but where the total quantity of power required over a long period of time is not great. Further, installations requiring such power service are sometimes remote and not reasonably accessible. One such environment is underwater transponder sonobuoys utilized for navigational guidance purposes. The only practical method of powering the transponder circuitry of these buoys is by electrochemical batteries, and a significant limiting factor in the useful life of these devices is therefore the shelf and/or standby life of the battery power supply.

SUMMARY OF THE INVENTION

The present invention relates generally to battery power supplies, and more particularly it relates to such power supplies whose shelf life prior to activation is essentially unlimited, and whose standby life once activated is extremely long.

One aspect of the electrical power supply of the present invention is the use of reserve or dry charged secondary electrochemical batteries. Reserve primary cell batteries and dry charged secondary batteries are known in the art. They are batteries wherein the electrodes are fully assembled for operation, but the electrolyte is held in reserve in a separate container which may be within the battery housing. Since there is no consumption of the electrodes under these circumstances, the shelf life of the battery is essentially indefinite. However, once the electrolyte is released from its reserve container, such as by mechanical puncture, explosive squib rupture, or any other means as are well known in the art, the battery is activated, and thereafter has a limited standby life.

In accordance with present invention, a series of reserve primary cell batteries or dry charged secondary batteries are employed in combination with a selective activation circuit. When all batteries of the system are in reserve status, the shelf life of the power supply is practically indefinite. However, once the first battery is activated, the standby life of the system is limited; but because of selective or controlled sequential activation of the series of batteries, an extremely long standby life is obtained. The total standby life of the power supply is a function of the standby characteristics of the individual batteries and the number of batteries in the series, and is the sum of the individual standby lives of all the batteries in the series.

Two circuits are described. In one a small portion of the energy of the activated battery is used to operate the selective activation circuit, which constantly monitors the output characteristics of this battery, particularly its output voltage. As the useful life of the activated battery nears its end, its output voltage drops and this occurrence induces a response from the selective activation circuit, which substitutes the next battery in the series for the expended one, and actuates a squib or other device to release its electrolyte supply from reserve.

The other circuit is based on the nearly linear relation between internal gas pressure within the battery and its state of discharge. Internal gas pressure within the battery, generated during discharge, activates a valve which is responsive to a given pressure level. Such valves are known in the art. When the pressure in the battery reaches this value indicating a state of discharge, the valve is actuated. As the useful life of the activated battery nears its end the internal pressure within the battery actuates this valve and the selective activation circuit substitutes the next battery in the series for the expended one, and actuates a squib or other device to release its electrolyte supply from reserve.

Thus in both cases, the next battery in the series is activated to provide the necessary electrical energy until its useful life approaches an end, whereupon the selective activation circuit substitutes the following battery in the series.

It is therefore one object of the present invention to provide an electrochemical power supply having an extremely long standby life.

Another object of the present invention is to provide for the selective activation of successive electrochemical batteries, as the useful life of each battery is expended.

Other objects and advantages of the present invention will become apparent to those skilled in the art from a consideration of the following exemplary detailed description of one specific embodiment of the invention, had in conjunction with the accompanying drawing, which is a schematic circuit drawing of a battery power supply and a selective activation circuit embodying the principles of the present invention.

BRIEF DESCRIPTION OF THE DRAWINGS

The invention is diagrammatically illustrated by way of example in the accompanying drawings in which.

DETAILED DESCRIPTION OF INVENTION

Figure 1:
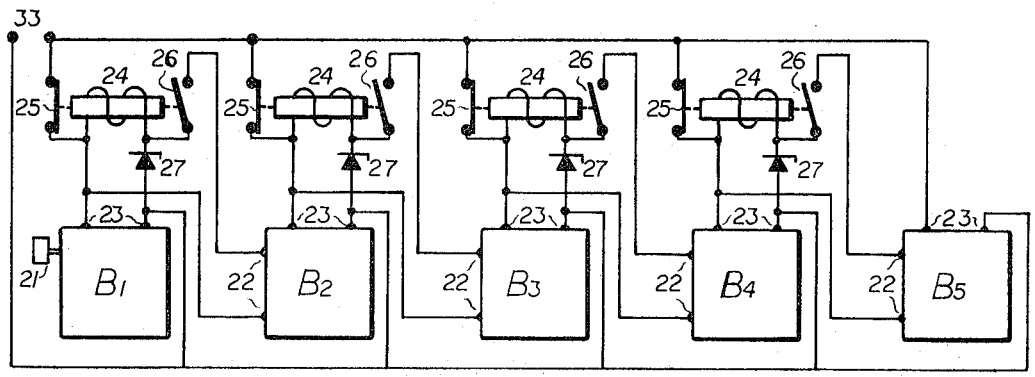
FIG. 1 is a schematically represented diagram illustrating one embodiment of the invention.

A series of batteries B1 through B5 is shown in the drawings. FIG. 1 and these are only schematically represented, because various structures therefore are well known in the art, and the details thereof are not material to the present invention. Each of these batteries is an electrochemical primary cell reserve battery or dry charged secondary battery. Battery B1 may be mechanically or manually activated, as suggested by the plunger 21. When plunger 21 is depressed, it punctures the electrolyte container in the battery housing, and thereby releases the electrolyte to the electrode compartment of the battery. The remaining reserve batteries B2 through B5 are activated by the firing of an electrically detonated small explosive squib within the battery casing. Thus, each of the latter batteries is provided with squib firing terminals indicated by the numeral 22. All of the batteries have the usual output terminals 23.

One output terminal of each battery is connected to a terminal of a relay 24. The other output terminal is connected to the other terminal of the relay 24 through a Zener diode 27. Thus, a relay 24 and a Zener diode 27 are connected in series across the terminals 23 of each of the batteries B1 – B5. The Zener diode 27 is chosen to have a voltage equal to the voltage of the battery B1 when it is discharged about 90 percent to 95 percent. Thus, when the battery has its full energy immediately after activation the voltage applied to the relay 24 is the difference between this voltage and that of the Zener diode 27. When the battery has been discharged 90 percent to 95 percent the voltage across relay 24 drops to zero and the relay opens, opening switch 25 and closing switch 26. When switch 25 is open, the battery B1 is disconnected from the power supply. When switch 26 is closed the squib is energized through terminals 22 of Battery B2. The output of B2 is thus supplied to the output terminals 33 of the power supply. The contacts 26 of the relays 24 are shown open because the contacts 25 are shown closed in FIG. 1. As is obvious from the above description, a contact 25 is closed only when its associated relay coil is energized. Thus, as shown in FIG. 1 it would appear that the contacts 26 would be normally closed. This of course cannot be the case since the battery next in line would be activated as soon as the previous battery is activated. Relays 24 are a type of relay in which contacts 26 are latched open until the relay is energized and then de-energized to close contacts 26. "Latch-out" or "latch-in" type relays are well known and such relays having numerous different latching arrangements are available on the market.

Operation of the power supply system for activation of the succeeding batteries is the same as described above and will therefore be apparent.

Figure 2:
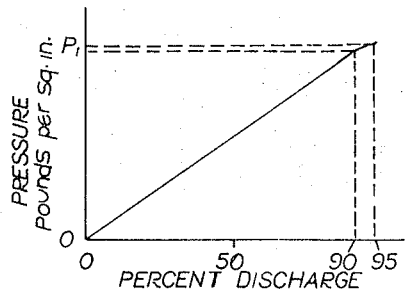
FIG. 2 is a graph of the generic characteristic of the pressure within a battery as a function of the percent discharge of the battery.

Another method to effect the actuation of successive batteries may be based on the relationship of gas pressure within the sealed container of a battery and the degree of discharge of the battery. This relationship is shown in FIG. 2 when a generic plot of this pressure in pounds per square inch is shown as a function of the degree of discharge of the battery. Originally, the battery gas pressure may be negative due to the vacuum in the plate compartment of the battery put there at the time of manufacture to preserve the electrodes and to suck in the electrolyte at such time as the container in which the electrolyte is stored, is punctured or otherwise broken. As discharge of the battery continues after activation, the pressure continually rises until the pressure reaches the value PI indicated in FIG. II.

Figure 3:
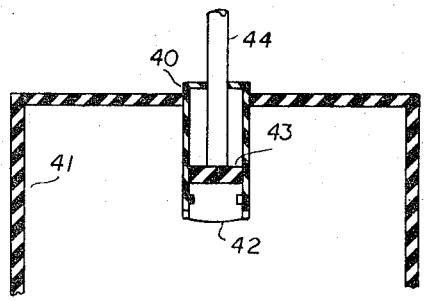
FIG. 3 is a cross-sectional view of the upper part of a battery container showing a crossection of the pressure responsive valve.

Valves actuated by pressure are well known in the art. In In FIG. 3 is shown one of this type valve 40 together with a section of the battery container 41. When the pressure within the container reaches a given value the diaphragm 42 is broken and the piston 43 is pushed upward forcing the piston rod 44 to the top of the valve 40. This action results in the closing of switch 50, FIG. 4, at which time the squib terminal 51 of battery B2 receives a voltage sufficient to activate the squib connected to these terminals.

Figure 4:
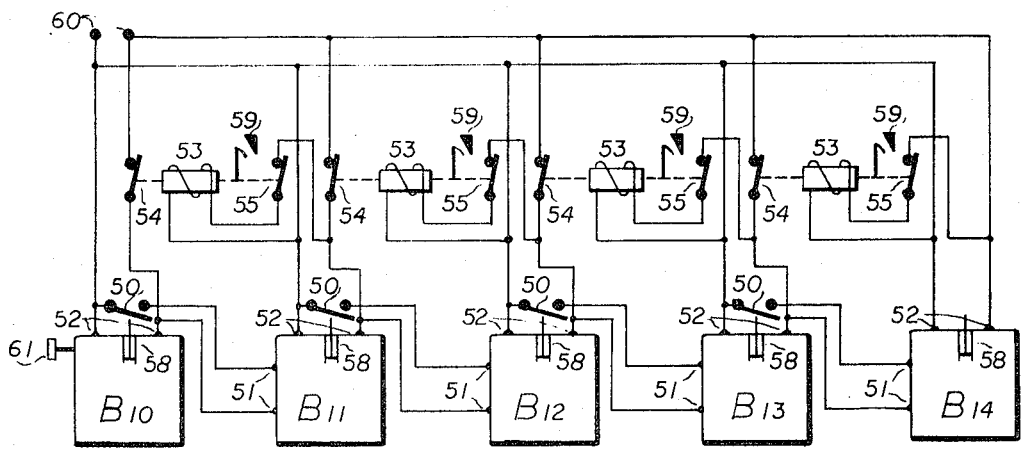
FIG. 4 is a schematically represented diagram illustrating another embodiment of the invention.

Again, in the drawing, FIG. 4 is shown a series of batteries. B10 through B14 and with pressure valves 58 indicated schematically because various structures therefore are well known in the art, and the details thereof are not material to the present invention. Each of these batteries is a primary reserve battery or a dry charged secondary battery with contained electrolyte. Battery B10 may be mechanically or manually activated, as suggested by the plunger 61. When plunger 61 is depressed, it punctures the electrolyte container in the battery housing, and thereby releases the electrolyte to the electrode compartment of the battery.

The remaining batteries B11 thru B14 are activated by the firing of an electrically detonated small explosive squib within the battery casing. Thus each of the latter batteries is provided with squib firing terminals indicated by the numeral 51. All of the batteries have the usual output terminals 52.

When the power supply is first put into service, one output terminal of each battery is connected thru a switch 54 to one of the output terminals 60 of the power supply. The other output terminal of each battery is connected directly to the other output terminal of the power supply. All the switches 54 are held in the closed position when the power supply is initially activated. Thus, when battery B10 is activated the output terminals 52 of battery B10 are connected to the output terminals 60 of the power supply. Similarly, the output terminals of each of the remaining batteries are also connected to the terminals 60. Until activated the internal impedance of these batteries is very high and does not effect the operation of the system.

Following initial activation, when battery B10 reaches a 90 percent to 95 percent discharge condition, the plunger of valve 58 rises and closes switch 50 energizing the squib of battery B11. As soon as battery B11 is activated, the solenoid 53 is energized opening switch 54. Simultaneously switch 55 is opened which disconnects the solenoid from the battery B11. The retainer 59 then holds switches 54 and 55 in an open position permanently, throughout the remaining life of the power supply, effectively disconnecting battery B 10 from the system.

Operation of the power supply FIG. 4, for activation of the succeding batteries is the same as described above and will therefore be apparent.

From the foregoing description, it will be appreciated that there is provided a standby battery power supply whose life is as long as the sum of the standby lives of all the batteries used in the battery series. An exceptional standby life for the power supply is obtained by the use of reserve cell batteries or dry charged batteries in combination with a selective activation circuit or device. When the useful life of the activated battery approaches its end, the activation circuit substitutes the next battery for the spent one, and simultaneously activates it by releasing its electrolyte to the battery electrode compartment. It is apparent that batteries other than reserve cell batteries or dry charged batteries can be employed, but the standby life will be shortened by the shelf life losses of those batteries in the supply awaiting utilization.

Many modifications and variations of the illustrated embodiment will be apparent to those skilled in the art. Accordingly such variations and modifications as are embraced by the spirit and scope of the appended claims are considered to be within the purview of the present invention.

What is claimed is:

1. A power supply comprising: output terminals; a plurality of batteries; means for sequentially coupling said plurality of batteries, one at a time to said output terminals, said means for sequentially coupling one of said batteries at a time to said output terminals comprising means for uncoupling from said output terminals the then coupled battery upon a change from normal of a predetermined battery characteristic and simultaneously coupling another battery, not previously coupled, to said output terminals.

2. A power supply as defined in claim 1 wherein said means for sequentially coupling said plurality of batteries, one at a time to said output terminals comprises a plurality of relays and diodes, one relay and one diode being connected in series across the terminals of each one of said plurality of batteries except for the last one of said plurality of batteries connected to said output terminals, said last battery being directly connected to said output terminals.

3. A power supply as defined in claim 2 wherein said predetermined battery characteristic is the output voltage and said coupled battery is uncoupled from said output terminals when said output voltage of said coupled battery falls below the normal operating voltage of said battery.

4. A power supply as defined in claim 3 wherein means are provided for actuating the first of said plurality of batteries coupled to said output terminals and said relays include means to actuate the next battery to be coupled to said output terminals from the power available from said battery just previously coupled to said output terminals.

5. A power supply as defined in claim 4 wherein said plurality of batteries are reserve cell batteries.

6. A power supply as defined in claim 4 wherein said batteries are dry charged batteries.

7. A power supply comprising: output terminals, a plurality of normally inactive batteries, said plurality of batteries each having an output voltage of zero when inactive and an output voltage greater than zero when active; means for activating a first one of said plurality of batteries; means for sequentially activating said plurality of batteries, one at a time, after said first one has been activated from the power available from the just previously activated battery when a predetermined characteristic of said just previously activated battery reaches an abnormal level; means for applying the output voltage of each of said plurality of batteries, including said first battery, to said output terminals when said battery is activated; and means for removing the output voltage of each battery, except the last battery activated, when said predetermined characteristic reaches said abnormal level, whereby said plurality of batteries are sequentially activated and the output voltage of each battery is sequentially applied and removed from said output terminals.

8. A power supply as defined in claim 7 wherein said plurality of batteries are dry charged batteries.

9. A power supply as defined in claim 8 wherein said plurality of batteries are reserve cell batteries.

10. A power supply as defined in claim 7 wherein said means for applying said output voltage of each battery to said output terminals when the battery is activated comprises a plurality of relays one less in number than the number of said plurality of batteries, said plurality relays each having first and second normally closed contacts, each of said first contacts of said plurality of relays being coupled between said output terminals and a different one of said plurality of batteries except for the last battery activated, said last battery activated being directly connected to said output terminals.

11. A power supply as defined in claim 10 wherein said relays are each sequentially activated by a different battery of said plurality of batteries, except said first one, when the said battery associated with that relay is activated and means are provided to lock open said first and second contacts of each said relay when the relay is energized thereby permanently uncoupling the just previously activated battery from said output terminals when said predetermined characteristic of that battery reaches a said abnormal level.

12. A power supply as defined in claim 11 wherein said predetermined characteristic is internal battery pressure.

13. A power supply as defined in claim 12 wherein a plunger is provided with each of said batteries and a normally open switch is provided across the battery terminals of each of said batteries, except for the last battery activated, said plungers each rising above the top of its associated battery to close the switch associated with that battery when said internal battery pressure reaches said abnormal level and thereby establishing a circuit for activating the next battery to be activated from said power available from the just previously activated battery.

14. A power supply as defined in claim 13 wherein said plurality of batteries are reserve cell batteries.

15. A power supply as defined in claim 13 wherein said batteries are dry charged batteries.

16. A power supply as defined in claim 7 wherein said predetermined characteristic is internal battery pressure.

17. A power supply as defined in claim 7 wherein said predetermined characteristic is battery output voltage.

18. A power supply as defined in claim 1 wherein said plurality of batteries are dry charged batteries.

19. A power supply as defined in claim 1 wherein said plurality of batteries are reserve cell batteries.

20. A power supply as defined in claim 1 wherein said predetermined battery characteristic is the battery output voltage.

* * * * *